United States Patent
Kim et al.

(10) Patent No.: US 9,312,743 B2
(45) Date of Patent: Apr. 12, 2016

(54) MOTOR FOR WASHING MACHINE, METHOD FOR MANUFACTURING SAME, AND WASHING MACHINE HAVING SAME

(71) Applicant: AMOTECH CO., LTD., Incheon (KR)

(72) Inventors: Byung Soo Kim, Anyang-si (KR); Se Ki Lee, Incheon (KR)

(73) Assignee: AMOTECH CO., LTD. (KR)

( * ) Notice: Subject to any disclaimer, the term of this patent is extended or adjusted under 35 U.S.C. 154(b) by 127 days.

(21) Appl. No.: 14/356,999

(22) PCT Filed: Nov. 9, 2012

(86) PCT No.: PCT/KR2012/009439
§ 371 (c)(1),
(2) Date: May 8, 2014

(87) PCT Pub. No.: WO2013/070008
PCT Pub. Date: May 16, 2013

(65) Prior Publication Data
US 2014/0305172 A1    Oct. 16, 2014

(30) Foreign Application Priority Data

Nov. 10, 2011    (KR) .................. 10-2011-0116787

(51) Int. Cl.
*H02K 16/02*    (2006.01)
*H02K 1/18*    (2006.01)
(Continued)

(52) U.S. Cl.
CPC .............. *H02K 16/02* (2013.01); *D06F 37/40* (2013.01); *H02K 1/148* (2013.01); *H02K 1/18* (2013.01); *H02K 15/0435* (2013.01); *H02K 16/00* (2013.01); *H02K 21/12* (2013.01); *D06F 37/304* (2013.01); *Y10T 29/49009* (2015.01)

(58) Field of Classification Search
CPC .......... H02K 1/148; H02K 1/18; H02K 16/02
USPC .................... 310/266, 216.008, 216.009
See application file for complete search history.

(56) References Cited

U.S. PATENT DOCUMENTS 6,257,027 B1 * 7/2001 Imai .................. D06F 37/304
                                                    68/12.12
6,992,419 B2 * 1/2006 Kim .................. D06F 37/304
                                                    310/266

(Continued)

FOREIGN PATENT DOCUMENTS

JP    2001145311    5/2001
JP    2004096874    3/2004

(Continued)

OTHER PUBLICATIONS

International Search Report—PCT/KR2012/009439 dated Feb. 28, 2013.

*Primary Examiner* — Burton Mullins
(74) *Attorney, Agent, or Firm* — Cantor Colburn LLP

(57) ABSTRACT

Provided is a motor for a washing machine including: an inner rotor connected to a dehydrating tub rotating shaft and rotated together; an outer rotor connected to a pulsator rotating shaft and rotated together; and a double stator having a first coil arranged to leave a gap between the inner rotor and the outer rotor and which interacts with the outer rotor, to thereby form a first magnetic circuit and a second coil which interacts with the inner rotor to thereby form a second magnetic circuit, in which a first drive signal is applied to the first coil and a second drive signal different from the first drive signal is applied to the second coil.

20 Claims, 10 Drawing Sheets

(51) Int. Cl.
*H02K 21/12* (2006.01)
*H02K 1/14* (2006.01)
*H02K 16/00* (2006.01)
*D06F 37/40* (2006.01)
*H02K 15/04* (2006.01)
*D06F 37/30* (2006.01)

(56) References Cited

U.S. PATENT DOCUMENTS

| | | | | |
|---|---|---|---|---|
| 7,557,486 B2 * | 7/2009 | Choi | ............ | D06F 37/304 310/154.33 |
| 7,687,969 B2 * | 3/2010 | Kim | ............ | D06F 37/304 310/180 |
| 7,777,386 B2 * | 8/2010 | Horst | ............ | H02K 1/146 310/156.01 |
| 2002/0047418 A1 * | 4/2002 | Seguchi | ............ | F02N 11/04 310/114 |
| 2004/0232800 A1 * | 11/2004 | Seguchi | ............ | F02N 11/04 310/266 |
| 2010/0050702 A1 * | 3/2010 | Kim | ............ | D06F 37/304 68/23 R |
| 2013/0169104 A1 * | 7/2013 | Jang | ............ | H02K 1/148 310/216.009 |

FOREIGN PATENT DOCUMENTS

| | | | | |
|---|---|---|---|---|
| JP | 2006296035 | | 10/2006 | |
| KR | 20010097203 A | * | 8/2001 | ......... H02K 1/12 |
| KR | 1020010097203 | | 11/2001 | |
| KR | 100438616 | | 6/2004 | |

* cited by examiner

MOTOR FOR WASHING MACHINE, METHOD FOR MANUFACTURING SAME, AND WASHING MACHINE HAVING SAME

TECHNICAL FIELD

The present invention relates to a motor for a washing machine that can selectively rotate a pulsator and a dehydrating tub by using only a motor without using a separate clutch, a method of manufacturing the same, and a washing machine using the same.

BACKGROUND ART

A conventional direct-drive type washing machine is disclosed in Korean Patent Registration Publication No. 10-0438616 on Jun. 23, 2004, which includes: a casing; an outer tub that is disposed inside the casing; a washing tub that is rotatably accommodated in the inside of the outer tub; a pulsator that is rotatably mounted on the bottom surface of the washing tub to enable a relative motion; a washing motor that is mounted at the bottom of the outer tub for generating a rotational force; a drive shaft assembly that is coupled to a rotor of the washing motor and transfers a rotational force of the washing motor to the washing tub or the pulsator; a washing tub rotating shaft whose one end is fixedly coupled with the washing tub; a pulsator rotating shaft that is inserted into the washing tub rotating shaft and whose one end is fixed to the pulsator; a rotating shaft coupling unit that couples the drive shaft assembly with the washing tub rotating shaft and the pulsator rotating shaft in a gear-driving type, and thus transfers the rotational force of the washing motor to the washing tub rotating shaft and the pulsator rotating shaft; a coupling unit that can move along the axial direction of the drive shaft assembly and that is coupled to the washing tub rotating shaft or the pulsator rotating shaft; a coupling unit lifting lever that lifts the coupling unit in the axial direction; and a lifting lever drive unit that is coupled with the coupling unit lifting lever and thus lifts up or pulls down the coupling unit lifting lever.

The rotating shaft coupling unit is configured to include a planetary gear set to slow down the pulsator rotating shaft and the washing tub rotating shaft, to thus play a role of transmitting power to one or both of the pulsator rotating shaft and the washing tub rotating shaft.

In addition, the coupling unit, the coupling unit lifting lever, and the lifting lever drive unit are configured to form a clutch device that transmits the rotational force of the washing motor to the pulsator rotating shaft, or both of the pulsator rotating shaft and the washing tub rotating shaft.

However, the direct-drive type washing machine according to the conventional art requires the coupling unit, the coupling unit lifting lever, and the lifting lever drive unit, in order to transmit the rotational force of the washing motor to both or one of the pulsator rotating shaft and the washing tub rotating shaft, to thereby increase the manufacturing cost, and make the structure become complicated.

Further, since the pulsator and the dehydrating tub do not rotate in different directions at the same time, it has a problem that performance of the washing machine is degraded.

DISCLOSURE

Technical Problem

To solve the above problems or defects, it is an object of the present invention to provide a motor for a washing machine, a method of manufacturing the same, and a washing machine using the same, in which a pulsator and a dehydrating tub can be made to selectively rotate by using only one motor, to thus remove components (such as a clutch and a planetary gear set) for selectively transmitting power to the pulsator and the dehydrating tub, to thereby reduce a manufacturing cost, and to thus simplify a manufacturing process.

It is another object of the present invention to provide a motor for a washing machine, a method of manufacturing the same, and a washing machine using the same, in which a clutch and a planetary gear set can be removed thereby reduce the total height of the washing machine.

It is still another object of the present invention to provide a motor for a washing machine, a method of manufacturing the same, and a washing machine using the same, in which a torque design can be achieved to fit each of a pulsator and a dehydrating tub, to thereby increase washing efficiency and motor efficiency.

It is yet another object of the present invention to provide a motor for a washing machine, a method of manufacturing the same, and a washing machine using the same, in which a pulsator and a washing tub can rotate in different directions to thus improve the performance of the washing machine.

The objects of solving the technical problems of the present invention are not limited to the objects of solving the above-mentioned problems, and it will be clearly understood from the following description by one of ordinary skill in the art that there will be other objects of the present invention.

Technical Solution

To accomplish the above and other objects of the present invention, according to an aspect of the present invention, there is provided a motor for a washing machine, the motor comprising: an inner rotor connected to a dehydrating tub rotating shaft and rotated together; an outer rotor connected to a pulsator rotating shaft and rotated together; and a double stator arranged to leave a gap between the inner rotor and the outer rotor, the double stator having a first coil which interacts with the outer rotor, to thereby form a first magnetic circuit and a second coil which interacts with the inner rotor to thereby form a second magnetic circuit, wherein a first drive signal is applied to the first coil and a second drive signal different from the first drive signal is applied to the second coil.

Preferably but not necessarily, the outer rotor comprises: a first rotor support spline-coupled to the pulsator rotating shaft; a first annular back yoke which is fixed to the outer surface of the first rotor support; and a first magnet that is mounted on the inner surface of the first annular back yoke and that is arranged to face the outer surface of the double stator while leaving a certain gap from the outer surface of the double stator.

Preferably but not necessarily, the inner rotor comprises: a second rotor support spline-coupled to the dehydrating tub rotating shaft; a second back yoke which is fixed to the outer surface of the second rotor support; and a second magnet that is mounted on the outer surface of the second back yoke and that is arranged to face the inner surface of the double stator while leaving a certain gap from the inner surface of the double stator.

Preferably but not necessarily, the double stator comprises a plurality of split core assemblies, and wherein one of the split core assemblies comprises: a split core on one side of which outer teeth are formed and on the other side of which inner teeth are formed; a bobbin that surrounds the outer surface of the split core and is an insulator; the first coil that is wound on the outer teeth and to which the first drive signal is applied; and the second coil that is wound on the inner teeth and to which the second drive signal different from the first drive signal is applied.

To accomplish the above and other objects of the present invention, according to another aspect of the present invention, there is provided a method of manufacturing a motor for a washing machine, the method comprising the steps of: producing a split core having an outer teeth and an inner teeth; forming a bobbin on the outer surface of the split core; after horizontally aligning a plurality of split cores, winding a first coil around the outer teeth and also winding a second coil around the inner teeth; alternately arranging three sets of split core assemblies to produce an annular stator; and assembling the stator between the outer rotor and the inner rotor.

To accomplish the above and other objects of the present invention, according to another aspect of the present invention, there is provided a washing machine comprising: a case forming an appearance; a washing tub that is suspended and supported on the inside of the case; a dehydrating tub that is rotatably disposed in the inside of the washing tub; a pulsator that is rotatably disposed in the inside of the dehydrating tub; a motor that is mounted on the bottom of the washing tub, and that drives the dehydrating tub and the pulsator simultaneously or selectively, wherein the motor comprises: an inner rotor connected to a dehydrating tub rotating shaft and rotated together; an outer rotor connected to a pulsator rotating shaft and rotated together; and a double stator arranged to leave a gap between the inner rotor and the outer rotor, the double stator having a first coil which interacts with the outer rotor, to thereby form a first magnetic circuit and a second coil which interacts with the inner rotor to thereby form a second magnetic circuit, wherein a first drive signal is applied to the first coil and a second drive signal different from the first drive signal is applied to the second coil.

Advantageous Effects

As described above, a motor for a washing machine according to the present invention can rotate both a pulsator and a dehydrating tub simultaneously, or one of them selectively by using only one motor, to thus remove components (such as a clutch and a planetary gear set) for selectively transmitting power to the pulsator and the dehydrating tub, to thereby reduce a manufacturing cost, and to thus simplify a manufacturing process.

In addition, an existing clutch and planetary gear set can be removed from a motor for a washing machine according to the present invention, thereby reduce the total height of the washing machine.

In addition, since respectively different drive signals are applied to a pulsator and a dehydrating tub, in a motor for a washing machine according to the present invention, a torque design can be achieved to fit each of a pulsator and a dehydrating tub, to thereby increase washing efficiency and motor efficiency.

Further, a motor for a washing machine of the present invention can rotate a pulsator and a washing tub at the same time in different directions, to thereby improve the performance of the washing machine.

BEST MODE

Figure 1:
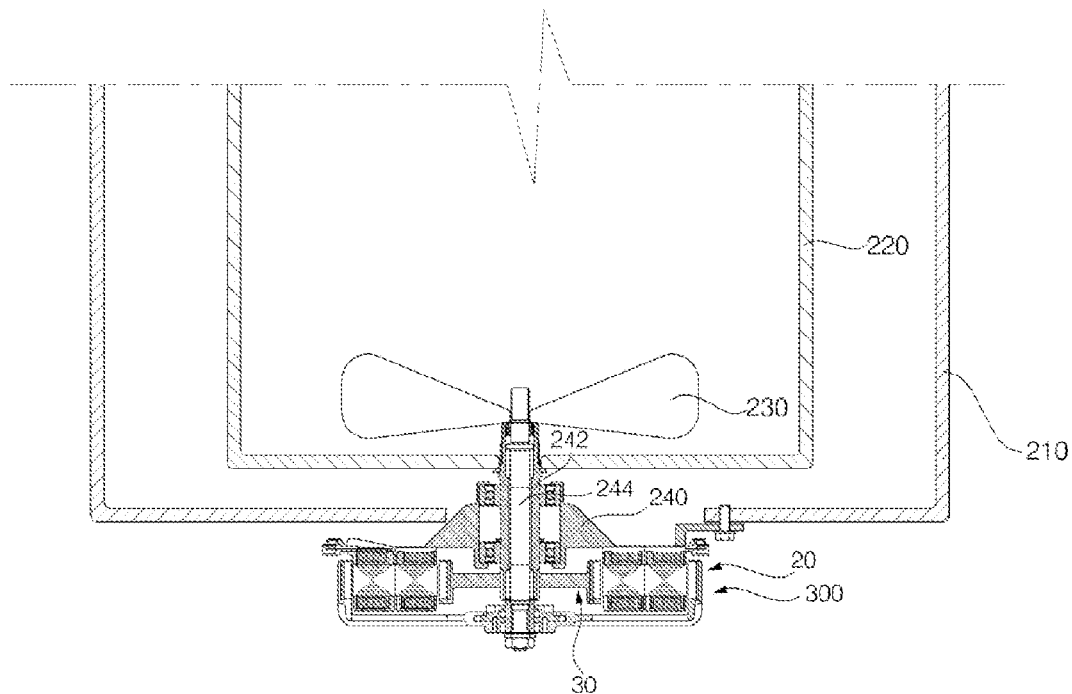
FIG. 1 is a cross-sectional view of a washing machine according to an embodiment of the present invention.

Hereinafter, embodiments of the present invention will be described in detail with reference to the accompanying drawings. In this process, the size and shape of the components illustrated in the drawings may be exaggerated for convenience and clarity of explanation. Further, by considering the configuration and operation of the present invention, the specifically defined terms can be changed according to a user or operator's intention or the custom. Definitions of these terms herein need to be made based on the content over the whole specification.

Figure 2:
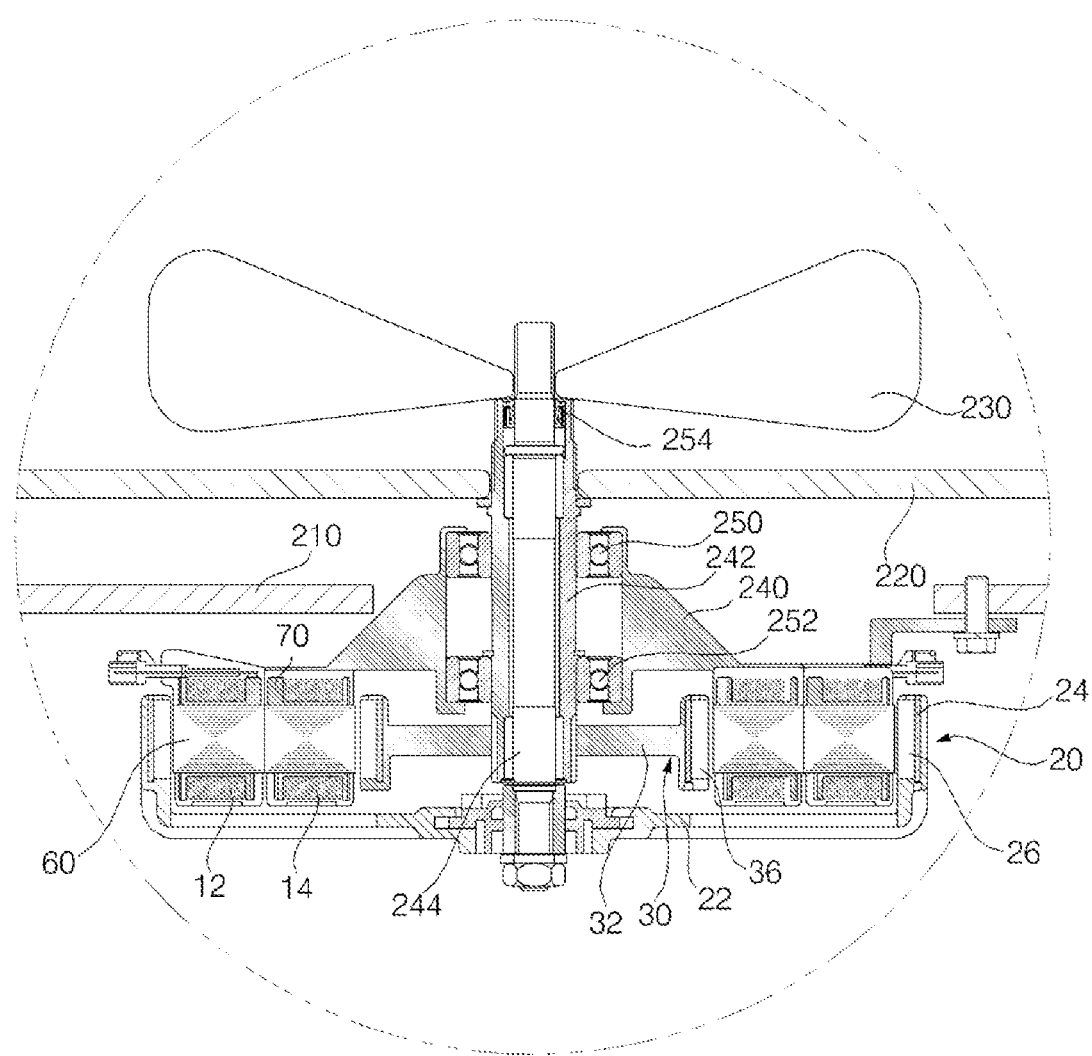
FIG. 2 is a cross-sectional view of a motor for a washing machine according to an embodiment of the present invention.
Figure 3:
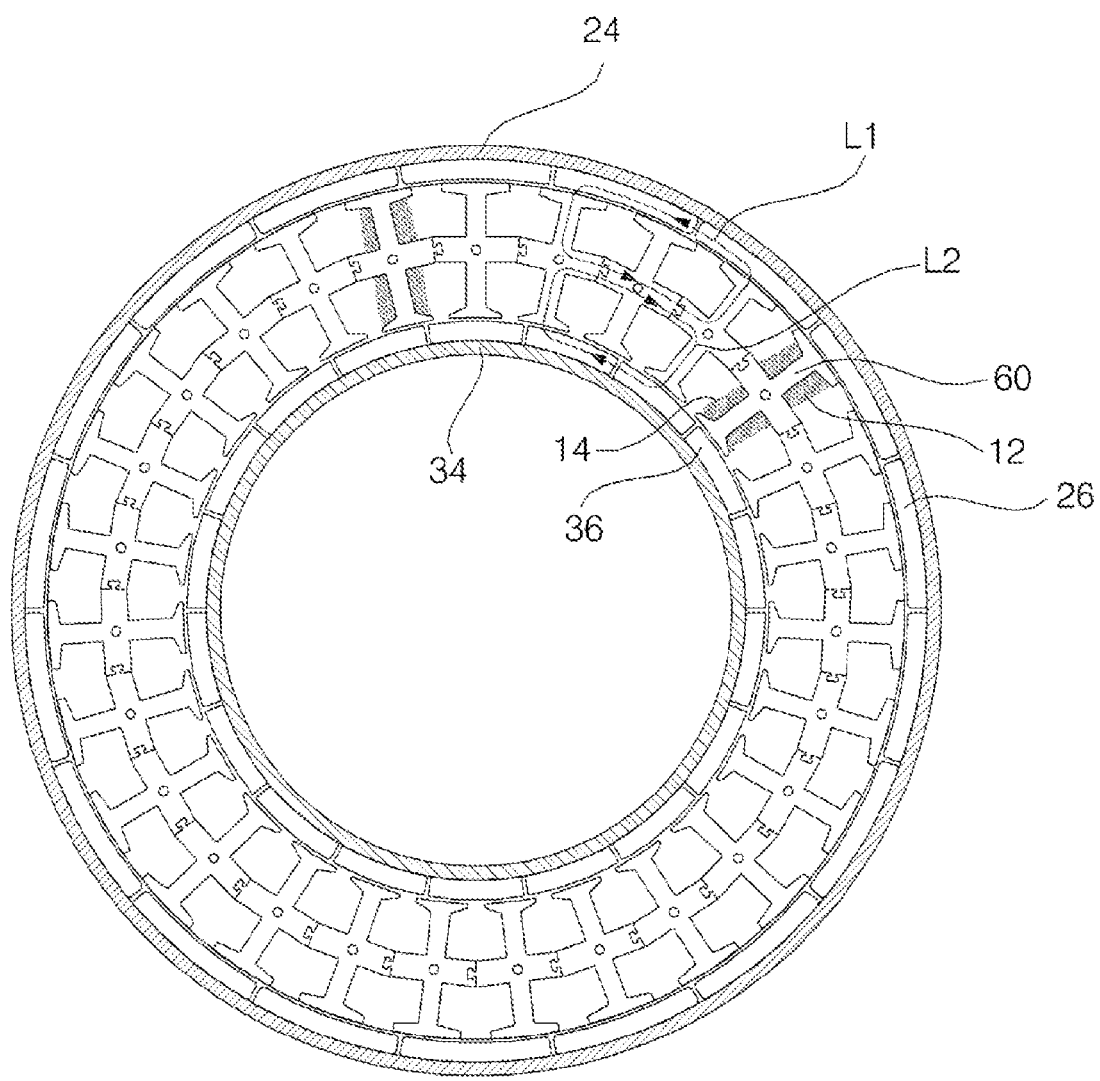
FIG. 3 is a plan view of a motor according to an embodiment of the present invention.

FIG. 1 is a cross-sectional view of a washing machine according to an embodiment of the present invention. FIG. 2 is a cross-sectional view of a motor for a washing machine according to an embodiment of the present invention. FIG. 3 is a plan view of a motor according to an embodiment of the present invention.

Referring to FIGS. 1 to 3, a washing machine according to an embodiment of the present invention, includes: a case forming an outer appearance; a washing tub 210 that is suspended in the inside of the case and accommodates laundry water; a dehydrating tub 220 that is rotatably disposed in the inside of the washing tub 210, to thus perform a laundry operation and a dehydration operation; a pulsator 230 that is rotatably disposed in the inside of the dehydrating tub 220, to thus form a laundry water stream; and a motor 300 that is provided in the lower portion of the washing tub 210, to thus drive the dehydrating tub 220 and the pulsator 230 simultaneously or selectively.

A support member 240 is fixed below the washing tub 210, and a dehydrating tub rotating shaft 242 that is connected to the dehydrating tub 220 to rotate the dehydrating tub 220 is rotatably supported to the support member 240. In addition, a pulsator rotating shaft 244 that is connected to the pulsator 230 to rotate the pulsator 230 is rotatably disposed in the inside of the dehydrating tub rotating shaft 242.

The motor 300 includes: a double stator 10 that is fixed below the washing tub 210; an outer rotor 20 that is positioned with a certain gap on the outer surface of the double stator 10 and is connected to the pulsator rotating shaft 244; and an inner rotor 30 that is positioned with a certain gap on the inner surface of the double stator 10 and is connected to the dehydrating tub rotating shaft 242.

The dehydrating tub rotating shaft 242 is formed in a hollow form. The upper portion of the dehydrating tub rotating shaft 242 is fixed to the dehydrating tub 220. The central portion of the dehydrating tub rotating shaft 242 is rotatably supported to the support member 240 through bearings 250 and 252 placed between the dehydrating tub rotating shaft 242 and the support member 240. The lower portion of the dehydrating tub rotating shaft 242 is spline-combined with the inner rotor 30, so that the dehydrating tub rotating shaft 242 is rotated together with rotation of the inner rotor 30.

The pulsator rotating shaft 244 is rotatably supported to the inner portion of the dehydrating tub rotating shaft 242. The upper portion of the pulsator rotating shaft 244 is fixed to the pulsator 230. The lower portion of the pulsator 230 is spline-combined with the outer rotor 20, so that the pulsator rotating shaft 244 is rotated together with rotation of the outer rotor 20.

A sealing member 254 is provided between the dehydrating tub rotating shaft 242 and the pulsator rotating shaft 244, to thus prevent laundry water filled in the dehydrating tub 220 from leaking.

The outer rotor 20 includes: a first rotor support 22; a first back yoke 24 that is fixed to one side of the first rotor support 22; and a first magnet 26 that is fixed on the inner surface of the first back yoke 24 and is disposed with a certain gap opposite the outer surface of the double stator 10.

The outer rotor 20 is configured by aligning the first back yoke 24 and the first magnet 26 in an annular form in a mold and then integrally molding the first rotor support 22 by an insert-molding method.

The back yoke 24 and the first magnet 26 are fixed to one side of the first rotor support 22 and the other side of the first rotor support 22 is spline-combined with the pulsator rotating shaft 244.

The inner rotor 30 includes: a second rotor support 32; a second annular back yoke 34 that is fixed to the outer surface of the second rotor support 32; and a second magnet 36 that is fixed to the outer surface of the second back yoke 34 and is disposed with a certain gap opposite the inner surface of the double stator 10.

The inner rotor 30 is configured by aligning the second back yoke 34 and the second magnets 36 in an annular form in a mold and then integrally molding the second rotor support 32 by an insert-molding method.

The second rotor support 32 is formed in the form of a disc whose central portion is open. The second back yoke 34 and the second magnet 36 are fixed on the outer surface of the second rotor support 32. The inner surface of the second rotor support 32 is spline-combined with the dehydrating tub rotating shaft 242.

As described above, the pulsator rotating shaft 244 is connected with the outer rotor 20, and thus is rotated together with rotation of the outer rotor 20, and the dehydrating tub rotating shaft 242 is connected with the inner rotor 30, and thus is rotated together with rotation of the inner rotor 30. As a result, the pulsator rotating shaft 244 and the dehydrating tub rotating shaft 242 are rotated separately or simultaneously.

Figure 4:
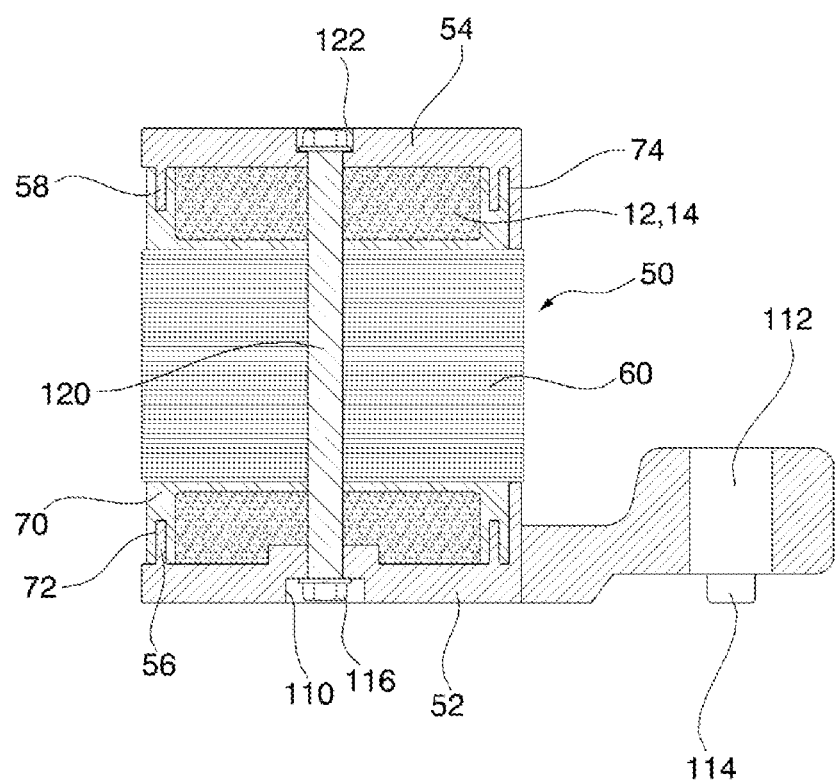
FIG. 4 is a partially cross-sectional view of a stator according to an embodiment of the present invention.

As shown in FIG. 4, the double stator 10 includes: a number of split core assemblies 50 around which a first coil 12 and a second coil 14 are wound, a lower fixing plate 52 to which the lower surface of the number of split core assemblies 50 are fixed at equal intervals in the circumferential direction; and an upper fixing plate 54 to which the upper surface of the number of split core assemblies 50 are fixed at equal intervals in the circumferential direction.

Figure 5:
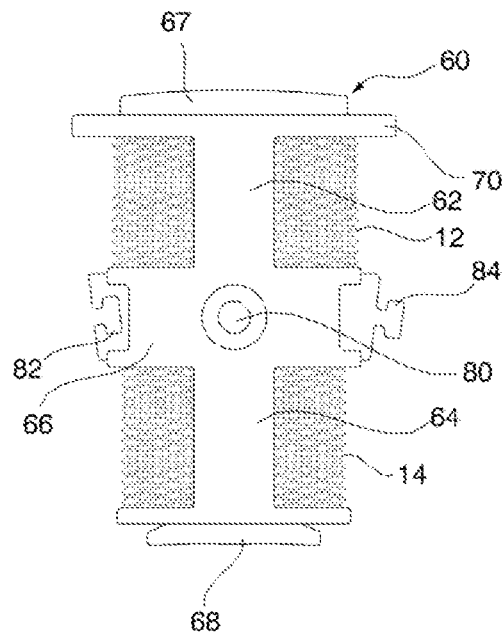
FIG. 5 is a cross-sectional view of a split core assembly according to an embodiment of the present invention.

As shown in FIG. 5, each of the split core assemblies 50 includes: a split core 60; a non-magnetic bobbin 70 surrounding the outer surface of the split core 60; the first coil 12 that is wound on one side of the split core 60 and through which a first drive signal is applied; and the second coil 14 that is wound on the other side of the split core 60 and through which a second drive signal different from the first drive signal is applied.

Here, since the first drive signal is applied to the first coil 12 and the second drive signal is applied to the second coil 14, the rotating torque of the pulsator 230 and the dehydrating tub 220 may be designed to suit for the respective rotating forces thereof, to thus improve the efficiency of the motor.

Figure 6:
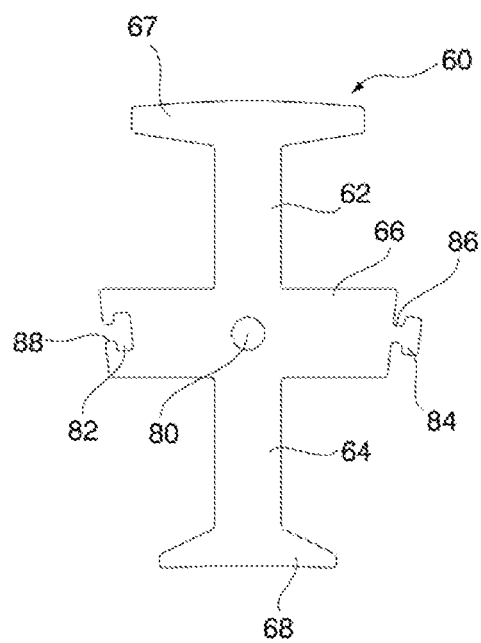
FIG. 6 is a plan view of a split core assembly according to an embodiment of the present invention.

As shown in FIG. 6, the split core 60 includes: an outer tooth 62 around which the first coil 12 is wound; an inner tooth 64 that is formed on the opposite side of the outer tooth 62 and around which the second coil 14 is wound; a partition 66 that divides between the outer tooth 62 and the inner tooth 64; and connectors 82 and 84 that are formed in a concave groove and a convex protrusion, at both ends of the partition 66, respectively, to thereby connect between the adjacent split cores 60 with each other.

A first extension portion 67 which is positioned facing the outer rotor 20 is formed at the end of the outer tooth 62, and a second extension portion 68 which is positioned facing the inner rotor 30 is formed at the end of the inner tooth 64.

In addition, a throughhole 80 is formed at the center of the split core 60, in order to tighten a plurality of laminated split cores with a bolt between an upper fixed plate 54 and a lower fixed plate 52.

The first extension portion 67 and the second extension portion 68 are formed into an introverted surface and an extroverted surface of a predetermined curvature, respectively, so as to correspond to a first magnet 26 of the outer rotor 20 and a second magnet 36 of the inner rotor 30, respectively. Thus, the roundness of the inner and outer circumferences of the split core 60 increases, to thus make the inner and outer circumferences of the stator 10 approach to the first magnet 26 and the second magnet 36, respectively, but to maintain even a constant magnetic gap.

The split cores 60 should be directly connected with each other so as to form a magnetic circuit between the split cores 60. Thus, the connectors 82 and 84 are formed in a concave groove and a convex protrusion, respectively, in a structure of directly electrically connecting between the split cores 60.

For example, the connectors 82 and 84 are formed into a coupling groove structure and a coupling protrusion structure, in which the connector 82 of the coupling groove structure is formed at one side of the partition 66 and the connector 84 of the coupling protrusion structure is formed at the other side of the partition 66, and thus the connector 84 is fitted into the connector 82. A narrow neck portion 86 is formed in the connector 84 of the coupling protrusion structure, and a narrow entrance portion 88 is formed in the connector 82 of the coupling groove structure, so that the neck portion 86 of the connector 84 is caught by the entrance portion 88 of the connector 82 of the coupling groove structure.

Figure 7:
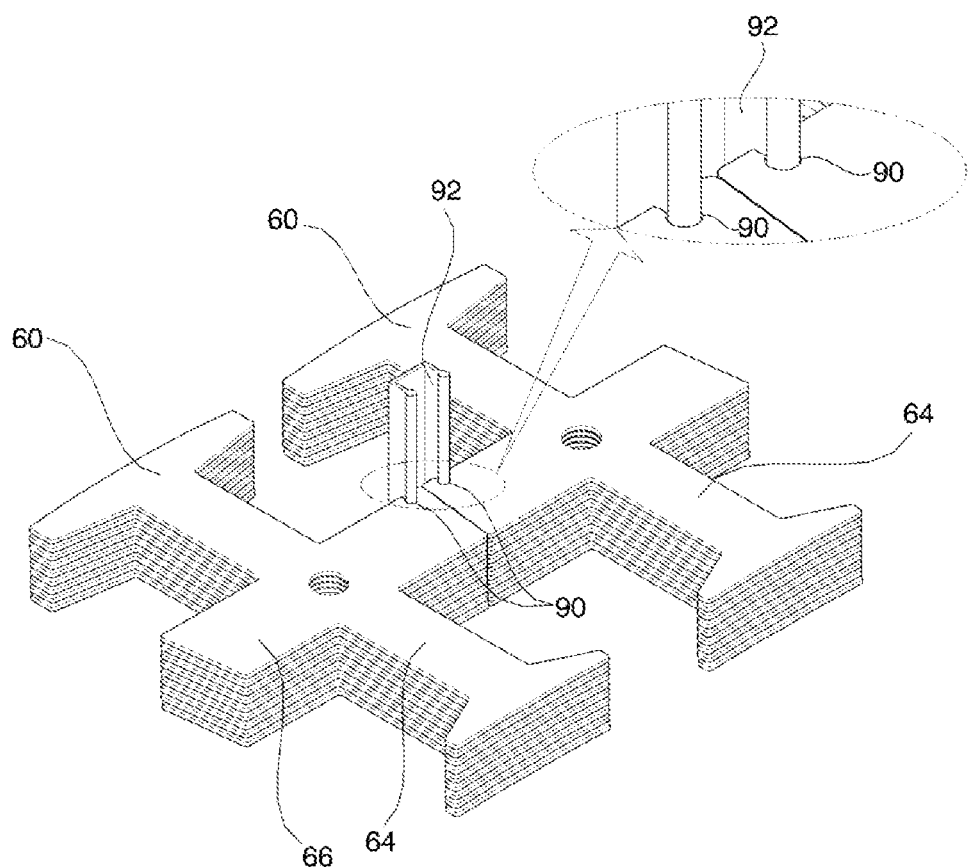
FIG. 7 is a perspective view of a split core joint according to another embodiment of the present invention.
Figure 8:
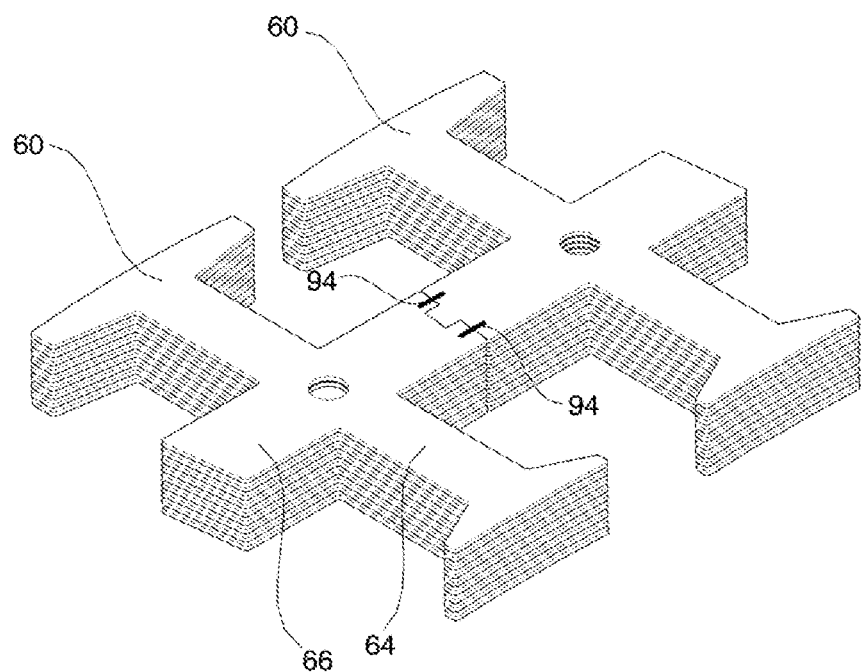
FIG. 8 is a perspective view of a split core joint according to another embodiment of the present invention.

In addition, as shown in FIG. 7, besides these coupling groove and protrusion structures, the connectors may be configured to have a structure that pin holes 90 are formed at both ends of the partition 66 of the split core 60, and a pin member 92 is fitted with the pin holes 90 of the two split cores at a state where the two split cores mutually contact, to thus connect between the split cores 60. In addition, as shown in FIG. 8, the connectors may be configured to have a structure that two split cores 60 may be caulked by using a caulking member 94 at a state where the two split cores mutually contact.

The bobbin 70 is configured to surround the outer surface of the remaining split core 60 except for the first extending portion 67 and the second extending portion 68 in a manner that the first extending portion 67 and the second extending portion 68 are exposed to cross-react with the first magnet 22 and the second magnet 24. In other words, the bobbin 70 is formed in the outer surface of the split core 60 by an insert molding method, and insulates between the split core 60 and each of the first coil 12 and the second coil 14.

The lower surface of the bobbin 70 is coupled to the lower fixing plate 52 and the upper surface of the bobbin 70 is coupled to the upper fixing plate 54. Thus, a first coupling groove 72 is formed in the lower surface of the bobbin 70 and fitted with a first coupling protrusion 56 formed in the lower fixing plate 52. In addition, a second coupling groove 74 is formed in the upper surface of the bobbin 70 and fitted with a second coupling protrusion 58 formed in the upper fixing plate 54.

Figure 9:
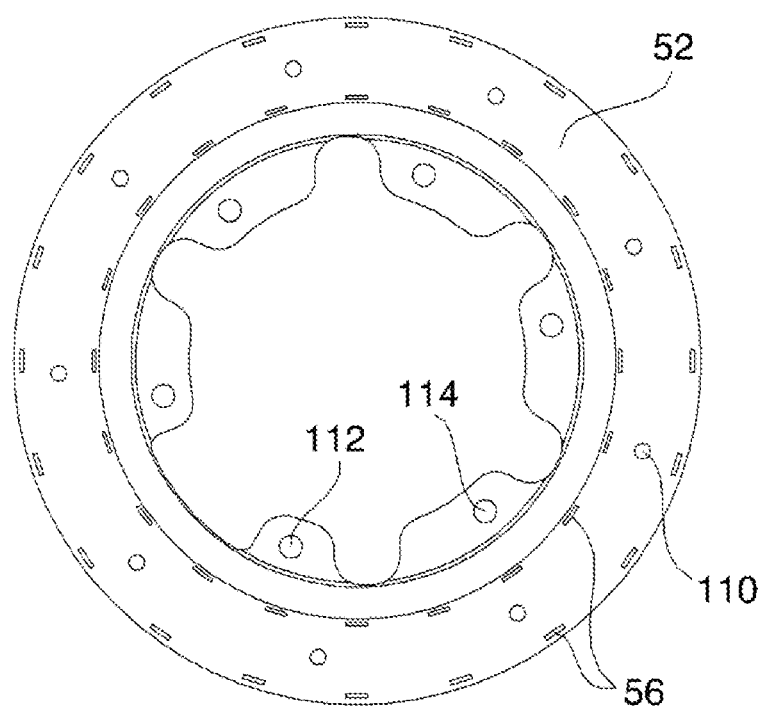
FIG. 9 is a plan view of an upper fixing plate according to an embodiment of the present invention.

As shown in FIG. 9, the lower fixing plate 52 is formed in a disc form in which the central portion of the lower fixing plate 52 is opened, and a plurality of first coupling protrusions 56 are protrudingly formed at equal intervals in the circumferential direction of the outer edge of the lower fixing plate 52, to thus be fitted into the first coupling groove 72 of the bobbin 70. In addition, a plurality of bolt fastening recesses 112 through which bolts are engaged are formed at the inner edge of the lower fixing plate 52 in order to fix the stator 10 in a structure. An alignment pin 114 for aligning an assembly position when the lower fixing plate 52 is mounted in the structure, is protrudingly formed between the bolt fastening recesses 112.

Figure 10:
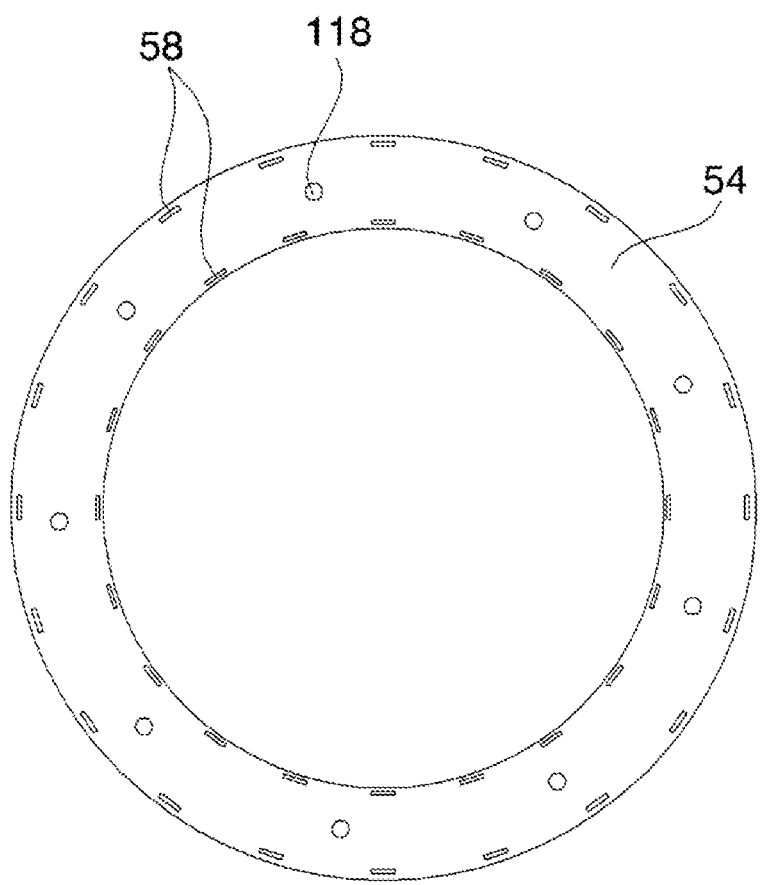
FIG. 10 is a plan view of a lower fixing plate according to an embodiment of the present invention.

As shown in FIG. 10, the upper fixing plate 54 is formed in a disc form in which the central portion of the upper fixing plate 54 is opened, and a plurality of second coupling protrusions 58 that are fitted into the second coupling grooves 74 formed on the upper surface of the bobbin 70 are protrudingly formed at equal intervals in the direction of the upper fixing plate 54.

In addition, the lower fixing plate 52 and the upper fixing plate 54 are engaged with the split core 60 via the bolt 120. Thus, a throughhole 80 through which the bolt 120 passes is formed in the split core 60. A first insertion recess 110 through which one of a bolt head and a nut 116 passes is formed in the lower fixing plate 52, and a second insertion recess 122 through which the other of the bolt head and the nut 116 passes is formed in the upper fixing plate 52.

As described above, the double stator 10 may be configured to have a structure of arranging the split cores 60 in a mold and then integrally molding the split cores 60 by an insert molding method, in addition to the structure of assembling the split cores 60 by combining the lower fixing plate 52 on the lower surface of the split cores 60 and combining the upper fixing plate 54 on the upper surface of the split cores 60.

In the case of the above-described motor, a first magnetic circuit L1 is formed between the outer rotor 20 and one side of the double stator 10 on which the first coil 12 is wound, that is, the outer stator, and a second magnetic circuit L2 is formed between the inner rotor 30 and the other side of the double stator 10 on which the second coil 14 is wound, that is, the inner stator, to thus form a pair of independent magnetic circuits to thereby make a magnetic path get shorter. As a result, a magnetoresistance is reduced, to thereby reduce the loss of a magnetic force and improve the efficiency of the motor.

Specifically, the first magnetic circuit L1 is formed so that a magnetic flux of the first magnetic circuit L1 passes an N-pole first magnet 26, an outer tooth 62 that faces the N-pole first magnet 26 and on which a first coil 12 is wound, an outer portion of a partition 66, an S-pole first magnet 26 adjacent to the N-pole first magnet 26, and a first back yoke 24.

In addition, the second magnetic circuit L2 is formed so that a magnetic flux of the second magnetic circuit L2 passes an N-pole second magnet 36, an inner tooth 64 that faces the N-pole second magnet 36 and on which a second coil 14 is wound, an inner portion of a partition 66, an S-pole second magnet 36 adjacent to the N-pole second magnet 36, and a second back yoke 34.

As described above, a process of manufacturing a stator according to an embodiment of the present invention will be described below.

Figure 11:
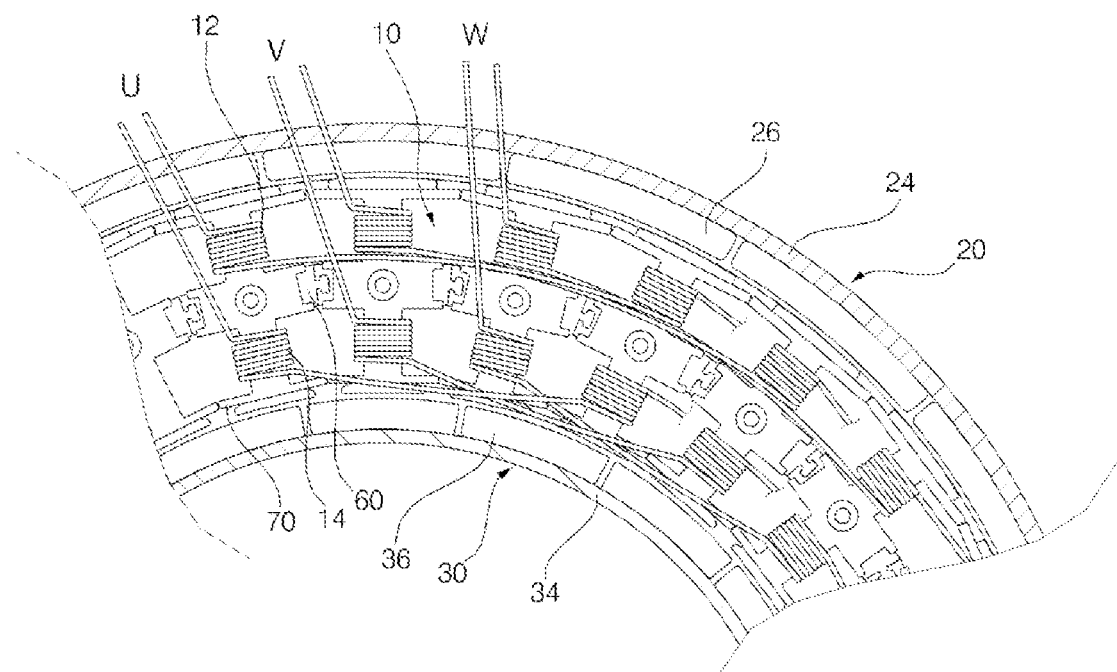
FIG. 11 is a plan view of a stator around which coils are wound according to an embodiment of the present invention.
Figure 12:
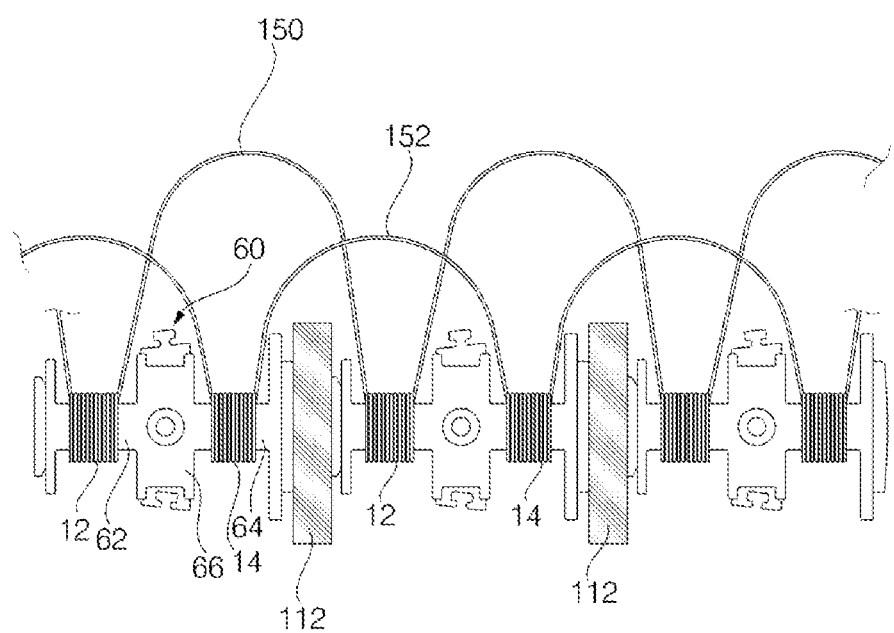
FIG. 12 is a side view showing a process of winding coils around a split core according to an embodiment of the present invention.

FIG. 11 is a plan view of a stator around which coils are wound according to an embodiment of the present invention. FIG. 12 is a side view showing a process of winding coils around a split core according to an embodiment of the present invention.

First, a plurality of the split cores 60 are laminated to then perform an insert-molding method, and thus the bobbin 70 is formed so as to be surrounded on the outer surface of the split cores.

Then, a coil winding process is performed by winding the first coil 12 on the outer teeth 62 of the split cores 60 and at the same time by winding the second coil 14 on the inner teeth 64 of the split cores 60.

In the case of the coil winding process, split cores 60 are arranged in a line. That is, the outer teeth 62 and the inner teeth 64 are aligned horizontally in a line, and the split cores 60 are fixed by using a jig 112 for aligning the split cores so that the split cores 60 are horizontally aligned. Here, it is preferable to use a magnet jig on both sides of which the split cores 60 are attached so that the core alignment jig 112 makes the split cores 60 fixed by using a magnetic force between the split cores 60.

As described above, after the split cores 60 are completely aligned, the first coil 12 is wound on the outer surfaces of the outer teeth 62 and at the same time the second coil 14 is wound on the outer surfaces of the inner teeth 64 by using a continuous winding device. Here, the first coil 12 and the second coil 14 are two different coils that are respectively individually wound on the outer teeth 62 and the inner teeth 64.

In this case, the split cores 60 are partitioned into the outer teeth and the inner teeth by partitions, and thus the first coil wound on the outer teeth 62 and the second coil wound on the inner teeth 64 may be wound at a state where they are separated from each other.

Then, the winding process of one split core 60 is completed, and then the coil winding is carried out successively for another split core 60 adjacent to the split core 60 whose winding process has been completed. That is, the first coil 12 is wound on the outer surfaces of the outer teeth 62 of the split cores 60 that are successively disposed adjacent to each other and at the same time the second coil 14 is wound on the outer surfaces of the inner teeth 64 thereof. Here, since a certain degree of margin is required between the split cores when the split core assemblies are assembled, a first jumper wire 150 is connected between the first coils 12 and a second jumper wire 152 is connected between the second coils 14.

Coils are successively wound on a plurality of split cores 60 by repeating the above-described coil winding process, and in the case of three phases, three sets of core assemblies 50 corresponding to each phase of U, V, and W are manufactured.

In the case of such a coil winding method according to the embodiment of the present invention, since the first coil 12 is wound on the outer surfaces of the outer teeth 62 and at the same time the second coil 14 is wound on the outer surfaces of the inner teeth 64, the first coil 12 and the second coil 14 are simultaneously wound. As a result, productivity can be improved to shorten the manufacturing time.

That is, if a process of winding the first coil 12 on the outer surfaces of the outer teeth 62 is separated from a process of winding the second coil 14 on the outer surfaces of the inner teeth 64, the number of processes of winding coils should be twice. However, since the first coil 12 and the second coil 14 are simultaneously wound in a single process in this embodiment, time to be taken for coil winding is saved productivity can be improved.

As shown in FIG. 12, when the split core assemblies are completely manufactured in the above-described manufacturing process, the split cores of the respective phases of U, V, and W are alternately arranged for each phase. Here, since the long jumper wires 150 and 152 are connected between the split cores 60 for each phase, even though the gap between the split core assemblies 50 becomes wide when the three phases of the split core assemblies 50 are alternately arranged, the split core assemblies 50 can be fully connected with the long jumper wires 150 and 152.

In the case of the assembling process of assembling the split core assemblies 50 with the lower fixing plate 52 and the upper fixing plate 54, the split core assemblies 50 are arranged in the direction on the upper surface of the lower fixed plate 52. That is, the first coupling protrusion 56 formed in the lower fixing plate 52 is fitted and assembled with the first coupling recess 72 formed in the lower surface of the bobbin 70.

Then, the upper fixing plate 54 is assembled on the upper surface of the split core assemblies 50. That is, the second coupling protrusion 58 formed in the upper fixing plate 54 is fitted and assembled with the second coupling recess 74 formed in the upper surface of the bobbin 70.

Then, the upper fixing plate 54, the split core assemblies 50 and the lower fixing plate 52 are completely assembled by using a fastening bolt 120.

In addition to the above-described bolt assembly structure, a method of integrally forming a stator support by aligning the split core assemblies 50 in a mold in the direction and then performing an insert molding method may be also applicable to the method of fixing the split core assemblies 50.

The function of the motor for a washing machine in accordance with an embodiment of the present invention will follow.

First, in the case that only the pulsator 230 is driven during washing, the outer rotor 50 is rotated, when the first drive signal is applied to the first coil 12. Then, the outer rotor 20 and the pulsator rotating shaft 244 are rotated, and thus only the pulsator 230 is rotated.

In this case, no drive signal is applied to the second coil 14, and thus the inner rotor 30 maintains a stop state.

Then, in the case of simultaneously rotating the pulsator 230 and the dehydrating tub 220 during dehydration or rinsing, the first and second drive signals are respectively applied to the first coil 12 and the second coil 14 at the same time. The outer rotor 20 is rotated by the magnetic circuit L1 while the pulsator rotating shaft 244 associated with the outer rotor 20 is rotated, and thus the pulsator 230 is rotated. Then, the inner rotor 30 is rotated by the magnetic circuit L2 while the dehydrating tub rotating shaft 242 connected to the inner rotor 30 is rotated, and thus the dehydrating tub 220 is rotated.

In addition, in the case that the pulsator 230 and the dehydrating tub 220 are reversely rotated against each other, during a loosening stroke or to eliminate the tangle of the laundry, the first drive signal is applied to the first coil 12 wound on the outer teeth 62 so that a rotating magnetic field is generated along a forward direction (first direction), while the second drive signal is applied to the second coil 14 wound on the inner teeth 64 so that a rotating magnetic field is generated along a reverse direction (second direction).

Then, the outer rotor 20 and the inner rotor 30 are rotated in the opposite directions to each other. Accordingly, the pulsator 230 and the dehydrating tub 220 are rotated in the opposite directions to each other.

The present invention provides a motor that is mounted in a washing machine, in particular, a full automatic washing machine having a pulsator, to generate a driving force, in which the pulsator and a dehydrating tub can be selectively driven by only the motor. Thus, a clutch that is mounted in an existing washing machine can be removed, to thus reduce the manufacturing cost and improve the efficiency of the motor and the washing machine.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The invention claimed is:

1. A motor for a washing machine, the motor comprising:
an inner rotor connected to a dehydrating tub rotating shaft;
an outer rotor connected to a pulsator rotating shaft; and
a double stator arranged to leave a gap between the inner rotor and the outer rotor, the double stator having a first coil which interacts with the outer rotor, to thereby form a first magnetic circuit and a second coil which interacts with the inner rotor, to thereby form a second magnetic circuit,
wherein a first drive signal is applied to the first coil and a second drive signal different from the first drive signal is applied to the second coil,
wherein the double stator comprises a plurality of split core assemblies,
wherein one of the split core assemblies comprises: a split core on one side of which an outer teeth are formed and on the other opposite side of which an inner teeth are formed; a bobbin that surrounds an outer surface of the split core and is an insulator, a partition between the outer teeth and the inner teeth, and a connecting unit that is formed at both ends of the partition and connects between the split cores adjacent to each other,
wherein the first coil to which the first drive signal is applied is wound on the outer teeth and the second coil to which the second drive signal different from the first drive signal is applied is wound on the inner teeth, and
wherein the connecting unit comprises: a coupling protrusion that is formed on one side of the partition; and a coupling recess that is formed on the other side of the partition and that is fitted with the coupling protrusion.

2. The motor for a washing machine as recited in claim 1, wherein the outer rotor comprises:

a first rotor support spline-coupled to the pulsator rotating shaft;
a first annular back yoke which is fixed to the first rotor support; and
a first magnet that is mounted on the first annular back yoke and that is arranged to face an outer surface of the double stator while leaving a certain gap from the outer surface of the double stator.

3. The motor for a washing machine as recited in claim 1, wherein the inner rotor comprises:
a second rotor support spline-coupled to the dehydrating tub rotating shaft;
a second back yoke which is fixed to the second rotor support; and
a second magnet that is mounted on the second back yoke and that is arranged to face an inner surface of the double stator while leaving a certain gap from the inner surface of the double stator.

4. The motor for a washing machine as recited in claim 1, wherein the double stator further comprises: a lower fixing plate to which a lower surface of the plurality of split core assemblies are fastened in a circumferential direction; and an upper fixing plate that is fastened on an upper surface of the plurality of split core assemblies in the circumferential direction.

5. The motor for a washing machine as recited in claim 4, wherein the coupling protrusions includes a first coupling protrusion and a second coupling protrusion, and the coupling recess includes a first coupling recess and a second coupling recess, and wherein the first coupling recess that is inserted into the first coupling protrusion formed on a lower fixing plate is formed on the lower surface of the bobbin, and the second coupling recess that is inserted into the second coupling protrusion formed on an upper fixing plate is formed on the upper surface of the bobbin.

6. The motor for a washing machine as recited in claim 1, wherein the connecting unit is connected by making two partitions of the split cores disposed adjacent to each other butt and then caulking by using a caulking member.

7. The motor for a washing machine as recited in claim 1, wherein the first coil is successively wound around the outer teeth of the plurality of the split core assemblies.

8. The motor for a washing machine as recited in claim 1, wherein the second coil is successively wound around the inner teeth of the plurality of the split core assemblies.

9. A motor for a washing machine, the motor comprising:
an inner rotor connected to a dehydrating tub rotating shaft;
an outer rotor connected to a pulsator rotating shaft; and
a double stator arranged to leave a gap between the inner rotor and the outer rotor, the double stator having a first coil which interacts with the outer rotor, to thereby form a first magnetic circuit and a second coil which interacts with the inner rotor, to thereby form a second magnetic circuit,
wherein a first drive signal is applied to the first coil and a second drive signal different from the first drive signal is applied to the second coil,
wherein the double stator comprises a plurality of split core assemblies,
wherein the split core assemblies comprises: a split core on one side of which an outer teeth are formed and on the other opposite side of which an inner teeth are formed; a bobbin that surrounds an outer surface of the split core and is an insulator, a partition between the outer teeth and the inner teeth, and a connecting unit that is formed at both ends of the partition and connects between the split cores adjacent to each other,
wherein the first coil to which the first drive signal is applied is wound on the outer teeth and the second coil to which the second drive signal different from the first drive signal is applied is wound on the inner teeth, and
wherein the connecting unit comprises: pin recesses that are formed at both ends of the partition and a pin member that is fitted between the pin recesses of two split cores that are disposed adjacent to each other.

10. The motor for a washing machine as recited in claim 9, wherein the outer rotor comprises:
a first rotor support spline-coupled to the pulsator rotating shaft;
a first annular back yoke which is fixed to the first rotor support; and
a first magnet that is mounted on the first annular back yoke and that is arranged to face an outer surface of the double stator while leaving a certain gap from the outer surface of the double stator.

11. The motor for a washing machine as recited in claim 9, wherein the inner rotor comprises:
a second rotor support spline-coupled to the dehydrating tub rotating shaft;
a second back yoke which is fixed to the second rotor support; and
a second magnet that is mounted on the second back yoke and that is arranged to face an inner surface of the double stator while leaving a certain gap from the inner surface of the double stator.

12. The motor for a washing machine as recited in claim 9, wherein the double stator further comprises: a lower fixing plate to which a lower surface of the plurality of split core assemblies are fastened in a circumferential direction; and an upper fixing plate that is fastened on an upper surface of the plurality of split core assemblies in the circumferential direction.

13. The motor for a washing machine as recited in claim 9, wherein the connecting unit is connected by making two partitions of the split cores disposed adjacent to each other butt and then caulking by using a caulking member.

14. The motor for a washing machine as recited in claim 9, wherein the first coil is successively wound around the outer teeth of the plurality of the split core assemblies.

15. The motor for a washing machine as recited in claim 9, wherein the second coil is successively wound around the inner teeth of the plurality of the split core assemblies.

16. A motor for a washing machine, the motor comprising:
an inner rotor connected to a dehydrating tub rotating shaft;
an outer rotor connected to a pulsator rotating shaft; and
a double stator arranged to leave a gap between the inner rotor and the outer rotor, the double stator having a first coil which interacts with the outer rotor, to thereby form a first magnetic circuit and a second coil which interacts with the inner rotor, to thereby form a second magnetic circuit,
wherein a first drive signal is applied to the first coil and a second drive signal different from the first drive signal is applied to the second coil,
wherein the double stator comprises a plurality of split core assemblies,
wherein the split core assemblies comprises: a split core on one side of which an outer teeth are formed and on the other side of which an inner teeth are formed; a bobbin that surrounds an outer surface of the split core and is an insulator,
wherein the first coil to which the first drive signal is applied is wound on the outer teeth and the second coil to which the second drive signal different from the first drive signal is applied is wound on the inner teeth, wherein the double stator further comprises: a lower fixing plate to which a lower surface of the plurality of split core assemblies are fastened in a circumferential direction; and an upper fixing plate that is fastened on an upper surface of the plurality of split core assemblies in the circumferential direction, and wherein a first coupling recess that is inserted into a first coupling protrusion formed on the lower fixing plate is formed on a lower surface of the bobbin, and a second coupling recess that is inserted into a second coupling protrusion formed on the upper fixing plate is formed on an upper surface of the bobbin.

17. The motor for a washing machine as recited in claim 16, wherein the split core further comprises:
   a partition between the outer teeth and the inner teeth; and
   a connecting unit that is formed at both ends of the partition and connects between the split cores adjacent to each other.

18. The motor for a washing machine as recited in claim 17, wherein the connecting unit comprises: a coupling protrusion that is formed on one side of the partition; and a coupling recess that is formed on the other side of the partition and that is fitted with the coupling protrusion.

19. The motor for a washing machine as recited in claim 17, wherein the connecting unit comprises: pin recesses that are formed at both ends of the partition and a pin member that is fitted between the pin recesses of two split cores that are disposed adjacent to each other.

20. The motor for a washing machine as recited in claim 16, wherein a throughhole through which a bolt passes is formed in the split core, a first insertion recess into which one of a bolt head and a nut is inserted is formed in the lower fixing plate, and a second insertion recess into which one of a bolt head and a nut is inserted is formed in the upper fixing plate.

* * * * *